Oct. 14, 1924.
A. SEGUIN
1,511,583
APPARATUS FOR THE MEASUREMENT OF FREQUENCY
Filed March 27, 1923    2 Sheets-Sheet 1
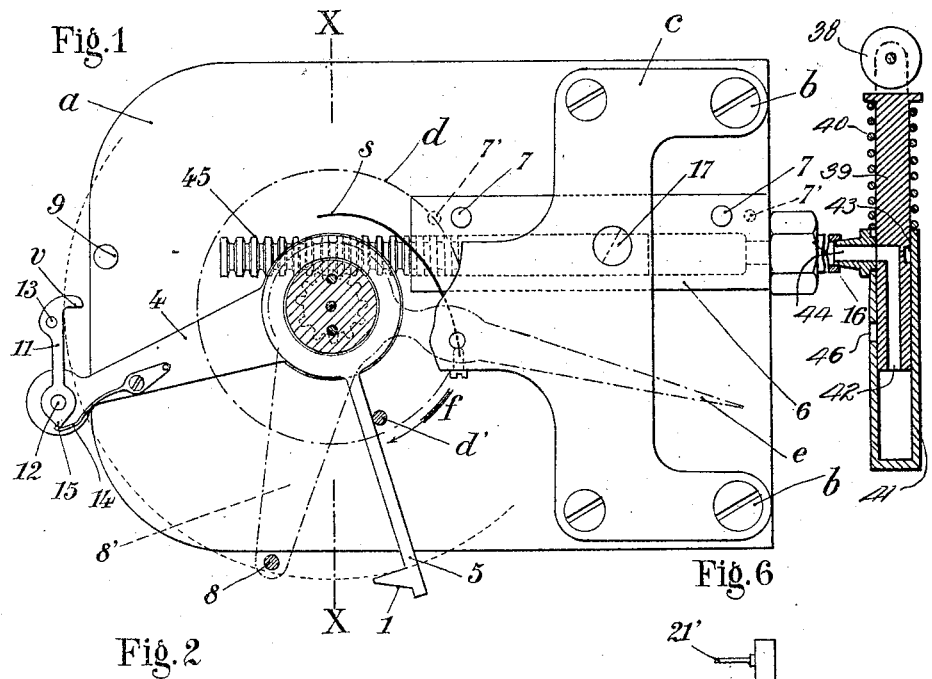
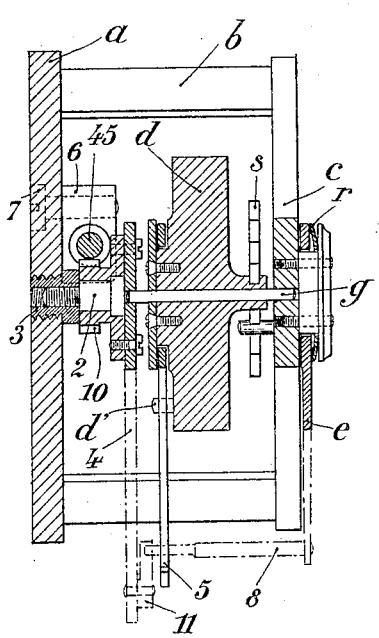
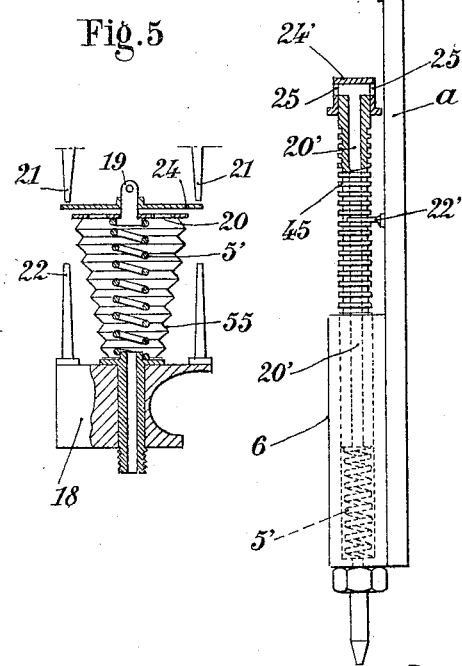
Inventor
Augustin Seguin
by Ottmann
his Attorney Oct. 14, 1924.  
A. SEGUIN  
APPARATUS FOR THE MEASUREMENT OF FREQUENCY  
Filed March 27, 1923 2 Sheets-Sheet 2
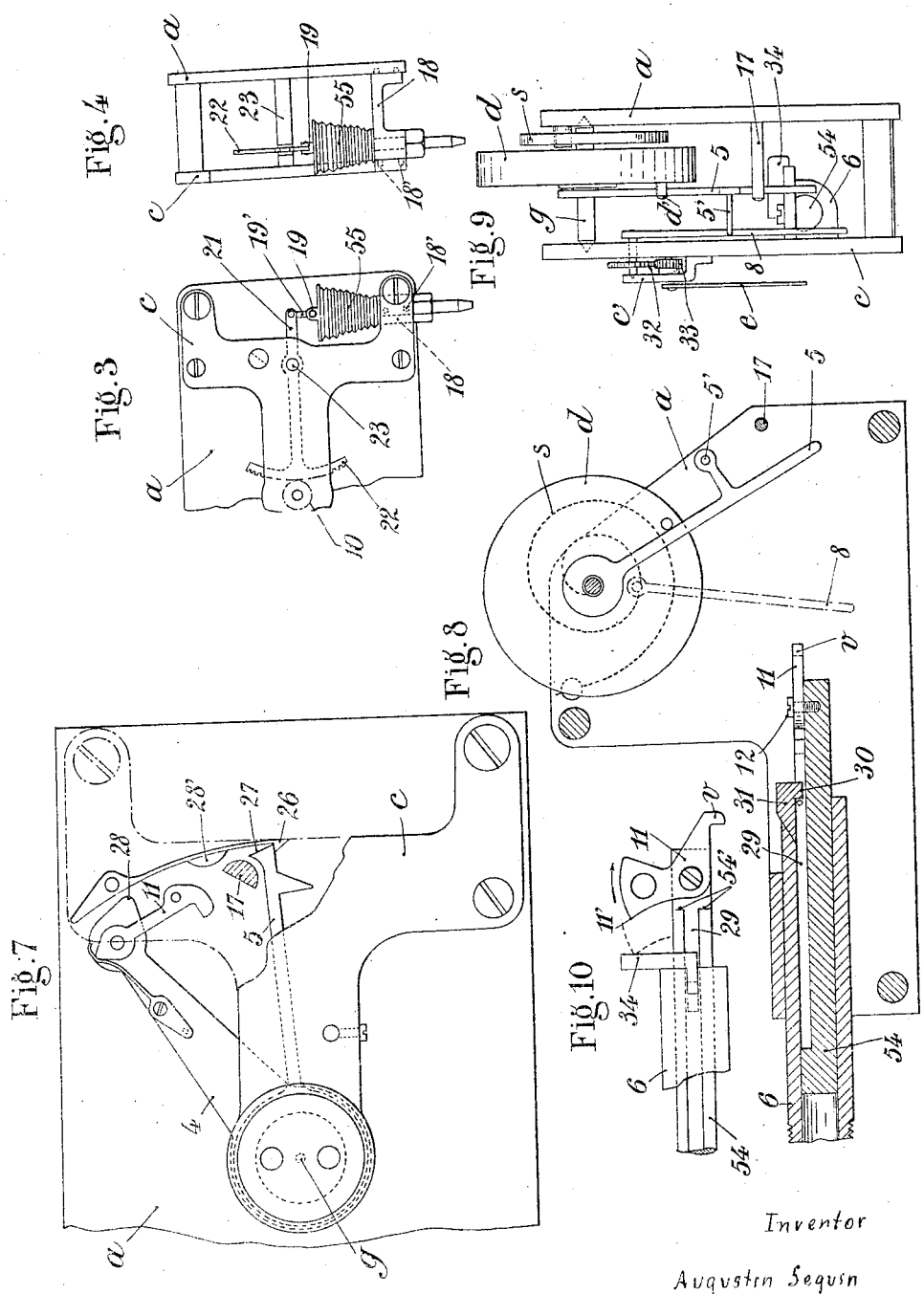
Inventor  
Augustin Seguin  
by *[signature]*  
his Attorney Patented Oct. 14, 1924.

1,511,583

UNITED STATES PATENT OFFICE.

AUGUSTIN SEGUIN, OF PARIS, FRANCE.

APPARATUS FOR THE MEASUREMENT OF FREQUENCY.

Application filed March 27, 1923. Serial No. 628,030.

*To all whom it may concern:*

Be it known that I, AUGUSTIN SEGUIN, citizen of the French Republic, residing at Paris, in the French Republic, have invented new and useful Improvements in Apparatus for the Measurement of Frequency, of which the following is a specification.

This invention relates to an apparatus for the measurement of frequency of the known type, wherein the motion of a first movable member actuated at the frequency to be measured is compared with the motion of a second movable member to which a movement of comparison is imparted.

According to this invention, an alternating movement is imparted to these two movable members, the first movable member driving the comparison member in a forward direction, the two movable members being then impelled in a rearward direction independently from each other, said rearward or comparison movement of the comparison member being retarded with respect to that of the first movable member, the desired indication being furnished by an indicating member whose position is determined by the position of the meeting point of the two movable members at the next oscillation of the said first member. The oscillations of the first movable member may be controlled by any suitable means such as a rigid, flexible liquid or gaseous transmission.

The desired indication may be furnished by an indicating pointer which moves over a graduated dial and is driven in one direction directly by the element of comparison, and in the other direction by the first movable element.

In the accompanying drawings, by way of example:

Fig. 1 is a front view of an apparatus according to the invention.

Fig. 2 is a detail sectional view of Fig. 1, along the line X—X.

Fig. 3 is a partial front view of the same apparatus with a modified form of control device.

Fig. 4 is a profile view of the same.

Figs. 5 and 6 are respectively detail views of a control bellows and a piston with automatic distribution.

Fig. 7 is a partial front view of a modification of the apparatus.

Fig. 8 is a front view of another modification of the apparatus.

Fig. 9 is a profile view of the same and

Fig. 10 is a detail plan view of the lever used for the control of the indicating pointer.

The oscillations whose frequency is to be measured will in the following descriptions always be supposed to have been brought to the first movable element. For this purpose, the element having the motion whose frequency is to be measured, will act upon a transmitting element consisting of an arm, an eccentric, a cam driving a lever, impelling a piston within a cylinder, a bellows or bulb of rubber for example, a metallic diaphragm subject to distortion analogous to those of barometers, an element periodically closing a conduit for gas or liquid etc., or upon any known mechanism capable of transmitting an oscillation having a frequency equal or proportional to that which is to be measured. This element is then connected with the first movable element of the apparatus through the medium of a suitable transmission.

The apparatus shown in Figs. 1 and 2 comprises the base plate *a* and a bridge piece, comprising the two cross pieces *b* and the plate *c*, within which are mounted the various movable parts of the apparatus. A screw 3 is screwed into the plate *a* and is adapted to receive another screw 2 constituting the axle of a small gear wheel 10 which is revoluble upon the screw 2 and is secured to an arm 4 carrying a lever 11. This lever 11 constitutes the above mentioned first movable element.

An axle *g* is journalled at one end in the head of the screw 2 and at the other end in the plate *c*; the said axle carries a balance wheel *d* provided with a spiral spring *s* whereof one end is secured to the balance wheel and the other end is attached to the plate *c*. A small pin *d'* secured to the balance wheel serves to drive in the direction of the arrow *f*, or rearward direction, a striker 5 mounted loose on the axle *g*. The striker 5 constitutes the second movable element to which the movement of comparison is imparted by the rearward movement of the balance wheel under the action of the expansion of the spring *s*. In Fig. 1, the balance wheel is shown in full and dotted lines for the sake of clearness of the figure. The gear wheel 10 engages a cylindrical rack constituted by circular grooves having a suitable profile which are formed on the periphery of a piston 45 reciprocating within a cylinder 6 secured by the screws 7 and the feet 7′ to the plate a; the stroke of the piston is limited in one direction by the rear end of the cylinder and in the opposite direction by a stop-piece 9. The lever 11 may pivot about an axle pin 12 secured to the arm 4 and is provided with a hook v which may be coupled with and drive the arm 8, secured to an extension 8′ of the indicating pointer e (also shown in full and dotted lines for sake of clearness in the figure), in opposite direction to the arrow f or forward direction. The lever 11 is also provided with a stud 13 co-operating with the striker 5 in order to wind up the balance wheel d through the intermediary of the pin d′ in the forward direction, but only after the pin 13 has risen upon the inclined part 1 of the striker 5, thus raising the lever 11 and disengaging the arm 8 and the indicating pointer from the action of this lever. The lever 11 is held in either of its coupling or uncoupling positions, by a small spring strip 14, secured to the arm 4 which presses against one side or the other of a small projection 15 formed at the rear part of the lever. When the arm 4 returns to the rear, the pin 13 engages under the inclined part 17 of a stop-piece secured below the bridge piece c, which impels it towards the centre and thus brings back the lever 11 to its coupling position. If, by means of a small transmission pipe secured to the connection 16 and communicating with the interior of the cylinder 6, alternate air impulses are caused to act upon the piston 45, the frequency of these impulses being in accordance with the frequency to be measured, this piston will assume oscillations of the same frequency and by means of the wheel 10 will transmit the same to the arm 4. The extreme positions in each oscillation are: on the one hand, the position of the arm 4 in which the pin 13 is engaged under the stop-piece 17, and on the other hand the position of this arm 4 in which the striker 5, impelled by the pin 13, has reached the extreme forward position and enters into contact with a fixed stop-piece, which may be placed at any point on its stroke and in particular, may be constituted by the stop-piece 17 itself. The indicating pointer e is held stationary, when it is not actuated by the striker 5 or by the lever 11, by the friction of a small convex steel disc r pressed against it.

The operation of the apparatus is as follows: The lever 11, impelled by the arm 4, being brought into its uncoupling position by the ramp 1 of the striker will drive said striker 5 and the balance wheel in the forward direction and the spring s is wound up, until the striker comes against the stop-piece 17; then, the lever 11 is impelled backwards while remaining in its uncoupling position, so that it will not engage the arm 8 until the stud 13 engages below the stop-piece 17 thereby returning the lever 11 to its coupling position. Meanwhile, the striker 5 being no longer impelled forwards, begins to return backwards under the action of the pin d′ of the balance wheel which is driven backwards by its spring, the balance wheel having been enabled, after the striker has been stopped by the stop-piece 17, to continue on its forward course and freely dampen its movement before the spiral spring drives it back. The arm 4, after a stop T, is driven forwards by the next impulse, and according to the position of the arm 8 of the pointer e, this arm 8 is actuated either by the hook v of the lever which is now in its coupling position, or by the striker 5 which returns rearwards, as far as the meeting point of the lever and the striker 5; at this point the lever 11 is raised and the striker 5 moves forward, so that the above-mentioned arm 8 will no longer be impelled. The pointer will thus be always brought to a position determined by the meeting point of the movable elements represented by the parts 13 and 5, that is a position depending upon the frequency of the motion of the arm 4, and which will remain unchanged if this frequency does not vary. According to the distance between the hook v and the stud 13, the length of the ramp 1 of the striker 5 and the thickness of the arm 8, a given variation in frequency is necessary in order to obtain a change in the position of the pointer, which determines a dead angle of stability.

It is quite evident that in this apparatus the same detail arrangements may be used as those set forth in my prior patent application Ser. No. 473,822. For example, the balance wheel may be frictionally mounted on its axle g to prevent rebounding, the pin d′ being mounted on a disc placed between the balance wheel and the striker, this disc being secured to the axle g; or further, the striker might be rigidly secured to the balance wheel.

The transmission of the oscillation as herein specified is realized by means of a piston solely by way of example. Also by way of example, this piston may be replaced by a bellows 55 (Figs. 3 and 4) secured to the cross-piece 18 held between the cheek a and the bridge piece c and secured by the feet 18′. This bellows is then connected with the transmission piping and will act in the same way as the above mentioned piston; its upper rigid end is provided with a coupling piece 19 to which is pivoted a link 19' which is also pivoted to the straight part 21 of a toothed sector 22. This toothed sector is adapted to oscillate about an axle pin 23 mounted between the plate a and bridge piece c and engages the pinion 10 to which the oscillations of the bellows 55 are thus transmitted. Obviously, this arrangement may also be used with a piston and cylinder instead of a bellows, and in like manner, many other forms of bellows or diaphragms, subject to distortion, of a metallic or other nature, may also be used.

In Figs. 3, 4, 5, 6, the balance wheel and its spring, as also the pointer, are not shown, as these figures show only transmission parts.

In the above described apparatus, the forward and back movements of the arm 4 are both controlled by means of the transmission part. It may be preferable to have but one of these movements controlled by the transmission part, and the other by a spring, and this spring may even be released at the proper time by the motion of the apparatus. By way of example, Figs. 5 and 6 show a bellows and a piston actuated in one direction by the transmission part by depression, and in the other direction by an internal spring whose action is determined by a distribution proper to the bellows and to the piston. A valve 24 mounted with slight friction on the connecting piece 19 is adapted to close or open the orifices 20 formed in the upper end plate of the bellows, this operation being controlled at the end of the stroke by the stop-piece 21, 22 secured to the frame of the apparatus. The valve being closed by the stop-pieces 21 under the action of the spring 5', if a depression takes place, the bellows will close, but as soon as the lower end of the stroke is reached, the stop-pieces 22 will open the valve and the spring 5' will raise the bellows and close the valve at the end of the upwards stroke. It is thus possible, for instance with a transmission comprising a cam and a piston, to give a slight slope to one of the ramps of the cam, while at the same time rapid movements of the bellows are obtained.

Fig. 6 shows a like disposition, with a piston urged by a spring 5'. The piston has a longitudinal bore 20' which may be closed by a valve 24' slidable on the head of the piston and controlled at the end of the upwards stroke by the stop-pieces 21', 22'. The holes 25 allow the air to escape when the valve is open. It is obvious that in these arrangements, the valves may also be controlled by the motion of the piston or of the bellows and placed for example at their inlet.

It may be advantageous to diminish and to reduce to zero the angle through which the striker 5 rotates during the time in which the arm 4 returns to the starting position, this angle being useless for the measurement. For this purpose (Fig. 7) when the balance wheel is entirely wound up and before the arm 4 returns to the rear, the rearward motion of the striker 5 may be stopped by a small hook 26 under which it can be engaged at the end of the forward stroke, due to a ramp 27. The striker 5 will now only be released when the arm 4 comes to the starting point and a finger 28 secured thereto lifts this hook by passing under a projection 28' disposed below the said hook.

Use can also be made of very simple apparatus in which the piston (Figs. 8, 9, 10) carries directly the lever 11. For this purpose, the said piston 54 is provided with a slot 29 in which is engaged the base 30 of a piece 31 secured to the cylinder and thus preventing the piston from turning about. The lever 11 is mounted upon a flat part formed on the piston head and may pivot about an axle pin 12. The lever is provided with a hook v which, when the lever is in its coupling position can impel in one direction the arm 8 secured to the indicating pointer e, directly, by means of speed increasing gears 32, 33 mounted in a small bridge piece c'. This arm 8 may be impelled in the other direction by an arm 5' secured to the striker 5. This lever 11 is brought to its coupling position, at the end of the rearward stroke of the piston 54, by the contact between its end part 11' and a curved part 34 of the piece 31, and is brought into its non-coupling position by the contact between its end part 11' and the striker 5, after which the end part 11' makes contact with the edge 54' of the piston and thus raises the striker 5. The operation is the same as that of the above described apparatus, and all the remarks concerning the latter are applicable to this type of apparatus.

In all these apparatus, the return of the lever 11 to its coupling position may also be effected at the time of the sudden forward departure of this lever solely by its inertia, by loading its portion v.

Fig. 1 illustrates an example of construction of transmitting piston. A cam (not shown) transmits by the roller 38 to the piston 39 urged by a spring 40 the movement whose frequency is to be measured. The piston reciprocates in a cylinder 41 and is provided with an axial conduit communicating with a slot 43 formed around the piston. The cylinder 41 has two holes 44 and 46; the upper hole communicates with the transmission conduit leading to the cylinder 6 and the lower hole with the outer air. During the ascent of the piston, the slot 43 having proceeded beyond the hole 46, the piston will produce a vacuum in the cylinder, and when the said slot 43 reaches the level of the hole 44, a suction will be produced in the distribution conduit. The cylinder will return to the outer pressure when the slot 43 coincides with the hole 46. The distributing arrangement may be operated as well upon compression, by inverting the position of the holes 44 and 46. Obviously, with this distributing arrangement it is necessary to use apparatus having one of the two strokes, forward or back, controlled by a spring, as has been set forth, but in this case, the profile of the cam will no longer affect the distribution, this being always sudden, and a very rapid forward and back motion may always be obtained even with a cam having a very slight slope.

It is also to be observed that all the movable parts of this apparatus, lever, arms, etc., may be balanced and be very light.

Obviously, even if the motion here considered is of any kind, for example linear or rotary, having a certain speed but without a proper frequency, it is always possible to transform this motion by known devices, into another whose frequency is proportional to this speed, and thus to measure this speed by measuring the frequency. For instance to measure the forward speed of a motor vehicle, this translation speed being for example transformed into speed of rotation by the Cardan shaft, this shaft will control a cam whose speed of rotation may be reduced with respect to the speed of rotation of the shaft, and which will provide for the alternating motion of a piston in a cylinder giving alternating impulsions of air which, through a small pipe will control (as above set forth) the first movable element. Again, to measure for example the speed of an aeroplane or of a ship, use will be made of an air tromp secured to the aeroplane or ship and immerged in air or water, the inside of said tromp being thus submitted to a depression, or of a trumpet within which a pressure will be caused. Said tromp or said trumpet will actuate the first movable element of the apparatus through a small pipe the depression or the pressure being periodically interrupted at a rate depending upon the speed to be measured by a shutter of any kind actuated by a propeller also immersed in the air or water and thus actuated at a speed proportional to the speed to be measured. Obviously, these apparatus could operate as well whether controlled by a thrust or traction, by pressure or depression (in which case use must be made of a reaction spring analogous to those above described) or at the same time by thrust and traction or by pressure and depression. Further, in apparatus using gaseous transmission, use may be made of a reservoir or a feeding device under pressure or depression (the apparatus whose frequency or speed is to be measured being itself used for maintaining this pressure or depression), the closing of the transmission pipe taking place at the outlet of this reservoir or of this feeding device.

It is also always feasible, in order to measure the frequency of a movement, to transform it into a second and different movement but having an equal or proportional frequency, and to measure the frequency of this second movement. According to requirements (and chiefly for liquid or gaseous transmissions) the forward and return movement of the oscillations of the first movable member of the apparatus may be made rapid in relation to the time of rest of said first member, and to practically use in the measurements only this time of rest (which will obviate the influence of the transmission upon the measurement). These forward and back movements may also be made slow in relation to this time of rest (chiefly with rigid transmissions), or oscillations whose law is the same as or like the one to be measured, but without transforming the latter, may be given to said first movable member. In all cases, it is preferable to reduce the time of rest of the first movable member at the end of its forward stroke, during which no measurement is made. (In most cases, this time is in fact practically null.)

Having now described my invention, what I claim as new and desire to secure by Letters Patent is:

1. An apparatus for the measurement of frequency comprising in combination: a driving member, means for imparting to said driving member an alternating movement at the frequency to be measured, a comparison member adapted to be driven by said driving member in a forward direction, means for imparting to said comparison member a rearward movement independent from the rearward movement of said driving member and retarded with respect to the latter, indicating means adapted to be actuated in one direction by said driving member and in the opposite direction by said comparison member, and to be released from said members when said members meet one another.

2. An apparatus for the measurement of frequency comprising in combination: a driving member, means for imparting to said driving member an alternating movement at the frequency to be measured, a balance wheel adapted to be driven by said driving member in a forward direction, a spiral spring adapted to impart to said balance wheel a rearward movement retarded with respect to the rearward movement of said driving member, indicating means adapted to be actuated in one direction by said driving member and in the opposite direction by said balance wheel and to be released from these two members when the latter meet one another.

3. An apparatus for the measurement of frequency comprising in combination: an axle, a swinging lever mounted on said axle, means for imparting to said axle an alternating movement at the frequency to be measured, a balance wheel, a striker operatively connected to said balance wheel, said swinging lever being adapted to drive said striker in a forward direction, a spiral spring adapted to impart to said balance wheel and striker a rearward movement retarded with respect to the rearward movement of said axle and indicating means adapted to be actuated in the forward direction by said swinging lever and in the rearward direction by said striker, said swinging lever and said striker being adapted to release at their meeting point said indicating means.

4. An apparatus for the measurement of frequency comprising in combination: a rotary arm, means for imparting to said arm an alternating rotary movement at the frequency to be measured, a swinging lever pivotally mounted on said arm, a balance wheel, a striker operatively connected to said balance wheel, said swinging lever being adapted to drive said striker in a forward direction, a spiral spring adapted to impart to said balance wheel and striker a rearward movement retarded with respect to the rearward movement of said arm, indicating means adapted to be coupled with said lever and driven by the same in a forward direction and to be driven in the rearward direction by said striker, a stop piece adapted to bring said lever into its coupling position at the beginning of each oscillation, and means on said striker to bring said lever into its uncoupling position at their meeting point whereby said indicating means is released at the same time from said lever and from said striker.

5. An apparatus for the measurement of frequency comprising in combination: a rotary arm, means for imparting to said arm an alternating rotary movement at the frequency to be measured, a swinging lever pivotally mounted on said arm, a balance wheel, a striker operatively connected to said balance wheel, said swinging lever being adapted to drive said striker in a forward direction, a spiral spring adapted to impart to said balance wheel and striker a rearward movement retarded with respect to the rearward movement of said arm, indicating means adapted to be coupled with said lever and driven by the same in a forward direction and to be driven in the rearward direction by said striker, a stop piece adapted to bring said lever into its coupling position at the beginning of each oscillation, means on said striker to bring said lever into its uncoupling position at their meeting point whereby said indicating means is released at the same time from said lever and from said striker, and a friction spring maintaining said lever in each of its coupling and uncoupling position.

6. An apparatus for the measurement of frequency comprising in combination: a rotary arm, means for imparting to said arm an alternating rotary movement at the frequency to be measured, a swinging lever pivotally mounted on said arm, a balance wheel, a striker operatively connected to said balance wheel, said swinging lever being adapted to drive said striker in a forward direction, a spiral spring adapted to impart to said balance wheel and striker a rearward movement, means for locking said striker at the end of its forward stroke, said arm being adapted to release the striker from said locking means at the end of its rearward stroke, indicating means adapted to be coupled with said lever and driven by the same in a forward direction and to be driven in the rearward direction by said striker, a stop piece adapted to bring said lever into its coupling position at the beginning of each oscillation, and means on said striker to bring said lever into its uncoupling position at their meeting point whereby said indicating means is released at the same time from said lever and from said striker.

7. An apparatus for the measurement of frequency comprising in conbination: a cylinder, a piston adapted to reciprocate in said cylinder, means for transmitting to said piston impulsions whose frequency is proportional to that to be measured, a rotary arm operatively connected to said piston, a swinging lever pivotally mounted on said arm, a balance wheel, a striker operatively connected to said balance wheel, said swinging lever being adapted to drive said striker in a forward direction, a spiral spring adapted to impart to said balance wheel and striker a rearward movement retarded with respect to the rearward movement of said arm, indicating means adapted to be coupled with said lever and driven by the same in a forward direction and to be driven in the rearward direction by said striker, a stop piece adapted to bring said lever into its coupling position at the beginning of each oscillation, and means on said striker to bring said lever into its uncoupling position at their meeting point whereby said indicating means is released at the same time from said lever and from said striker.

8. An apparatus for the measurement of frequency comprising in combination: a driving member, pneumatic means transmitting to said driving member impulsions in a forward direction, the frequency of said impulsions being proportional to that to be measured, yielding means for actuating said driving member in a rearward direction, said pneumatic means being provided with automatic outlet valves, a comparison member adapted to be driven by said driving member in the forward direction, means for imparting to said comparison member a rearward movement independent from the rearward movement of said driving member and retarded with respect to the latter, indicating means adapted to be actuated in one direction by said driving member and in the opposite direction by said comparison member and to be released from said members when said members meet one another.

9. In combination with the apparatus claimed in claim 8, a control device comprising: a cylinder, a spring controlled piston adapted to reciprocate in said cylinder at a frequency which is proportional to that to be measured, inlet and outlet air orifices in said cylinder, said orifices being controlled by said piston and a pipe connecting said outlet orifice to said pneumatic means.

In testimony whereof I have signed my name to this specification.

AUGUSTIN SEGUIN.